(12) United States Patent
Marlowe

(10) Patent No.: US 6,231,648 B1
(45) Date of Patent: May 15, 2001

(54) WET SCRUBBER UNIT

(75) Inventor: Delane Marlowe, Mooresville, NC (US)

(73) Assignee: TAS Enterprises, Mooresville, NC (US)

( * ) Notice: Subject to any disclaimer, the term of this patent is extended or adjusted under 35 U.S.C. 154(b) by 0 days.

(21) Appl. No.: 09/188,987

(22) Filed: Nov. 9, 1998

Related U.S. Application Data

(63) Continuation-in-part of application No. 08/815,747, filed on Mar. 12, 1997.

(51) Int. Cl.[7] .................... B01F 3/04; B01D 47/00
(52) U.S. Cl. ..................... 96/243; 96/355; 261/78.2; 261/118; 55/342
(58) Field of Search .................. 261/78.2, 118; 96/274, 277, 319, 320, 324, 325, 355, 243; 95/216, 221; 55/435, 342; 62/314

(56) References Cited

U.S. PATENT DOCUMENTS

| | | | | |
|---|---|---|---|---|
| 355,291 | * | 1/1887 | Anderson | 261/118 |
| 420,378 | * | 1/1890 | Dye | 261/118 |
| 2,720,085 | * | 10/1955 | Boyle | 62/314 |
| 2,913,232 | * | 11/1959 | Silverman | 261/78.2 |
| 4,529,421 | * | 7/1985 | Parma | 55/435 |
| 5,041,274 | * | 8/1991 | Kagi, Sr. | 95/216 |
| 5,866,046 | * | 2/1999 | Tozawa | 261/78.2 |

* cited by examiner

Primary Examiner—David A. Simmons
Assistant Examiner—Robert A. Hopkins
(74) Attorney, Agent, or Firm—Hopgood, Calimafde Judlowe & Mondolino

(57) ABSTRACT

A wet electrostatic scrubber unit for extracting from a polluted air stream particulate matter entrained therein, whereby emerging from the unit is an environmentally acceptable air stream. The unit includes a treatment station having a cylindrical duct through which is blown the polluted air stream. Coaxially disposed within the duct is a water delivery pipe having nozzles along its length from each of which is projected a radial beam of water. The radial beam collides with the inner surface of the duct to create a turbulent mist which is intercepted by the polluted air stream flowing through the duct. The velocity of the radial beam is such as to cause it to collide with the duct surface with sufficient force to triboelectrically generate negative ions. These cause the mist to acquire an electrostatic charge to capture the contaminates entrained in the polluted air stream. The negative ions also react with oxygen in the air stream to produce ozone that oxidizes the particulate matter captured by the mist.

14 Claims, 4 Drawing Sheets

WET SCRUBBER UNIT

RELATED APPLICATION

This application is a continuation-in-part of my copending application Ser. No. 08/815,747 filed Mar. 12, 1997 entitled "Wet Gas Stripper" whose entire disclosure is incorporated herein by reference.

BACKGROUND OF INVENTION

1. Field of Invention

This invention relates generally to air pollution control devices, and more particularly to a wet electrostatic scrubber unit for extracting particulate matter entrained in a polluted air stream, whereby emerging from the unit is an environmentally-acceptable air stream.

2. Status of Prior Art

The concern of this invention is with air pollution resulting from the emission into the atmosphere of particulate matter and other contaminants. As noted in the Federal Register of Dec. 27, 1996 (Vol. 61, No. 25), "The primary goal of the Clean Air Act is to enhance the quality of the Nation's air resources and to promote the public health and welfare and the productive capacity of its population."

The same volume of the Federal Register deals with reducing emissions of hazardous air pollutants (HAP) from plants that manufacture flexible polyurethane foam. The HAP emitted by these plants include methylene chloride, toluene diisocyanate and several other compounds. However methylene chloride accounts for over 98 percent of the total HAP.

In my above-identified copending patent application there is disclosed a wet scrubber that is particularly applicable for use in industrial plants that emit hazardous air pollutants, such as plants producing flexible polyurethane foam.

The wet scrubber disclosed in my copending application integrates the normal action of a wet scrubber in which pollutants in a gaseous stream are contacted with water, and the action of an electrostatic precipitator in which pollutants are extracted electrostatically.

A conventional electrostatic precipitator passes a polluted gas stream between spaced electrodes across which is applied a high direct voltage, such as 15,000 VDC. The resultant electrostatic field acts to charge particles entrained in the gaseous stream and to cause them to migrate toward one of the electrodes and be collected thereby. The main drawback of a conventional electrostatic precipitator, apart from requiring a high voltage supply, is that the contaminants collected on the collecting electrode tend to adhere thereto. This makes it necessary, on occasion, to shut down the precipitator in order to scale off the accumulated dirt.

Wet electrostatic precipitators are known having a curtain of water flowing down the collecting electrode to wash away dirt particles, thereby preventing the particles from adhering to this electrode. But should water be sheared off this curtain by the gas stream being blown through the precipitator, then sparking will occur, making it necessary to shut down the precipitator or to reduce the velocity of the air stream.

In a wet scrubber of the type disclosed in my copending application, an electrostatic charge is produced in a treatment station not by a high voltage as in an electrostatic precipitator, but by a triboelectric action arising from friction produced when a beam of water collides with a hard surface in the station. The force of this collision is such as to generate negative ions which electrostatically charge the turbulent mist resulting from the collision, thereby capturing particulate matter entrained in the polluted air stream intercepting the mist.

The treatment station disclosed in my copending application has a rectangular configuration, with a row of nozzles mounted on one wall of the station which project multiple beams of water that strike a parallel wall to produce a turbulent mist that is electrostatically charged as a result of ions generated by the collision. However, the turbulent mists and the ions generated in the rectangular station are not dispersed throughout the station, particularly at the four right-angle corners which are effectively dead spots.

Of prior art interest are the wet scrubbers disclosed in the Sibley et al. U.S. Pat. No. 4,609,386 and in the Clark U.S. Pat. No. 2,802,542. In these scrubbers, pollutants are removed from a gaseous or air stream by passing the polluted air through a scrubber chamber in a tortuous path, the flowing air being contacted by water sprayed into the chamber by nozzles. This action causes pollutants to be transferred from the polluted air to the water, thereby cleaning the air.

The reason wet scrubbers of the type heretofore known do not triboelectrically generate ions even though water projected from nozzles mounted on one wall of the scrubber strike another wall thereof is that the collision of the water with the wall does not have sufficient force to provide the friction necessary to generate a significant amount of ions. Thus in the Clark patent the water projecting from each nozzle flares out, so that when striking a wall it then has little impact force.

Wet scrubbers of the type heretofore known transfer the particulate matter extracted from the polluted gaseous stream to the water, as a consequence, of which the water emerging from the scrubber is contaminated. While the usual practice is to feed water discharged from a wet scrubber into a sewer line, in doing so one may violate existing environmental protection regulations.

If the contaminants in the water discharged from the wet scrubber are innocuous, the discharge is then "sewerable". But if the contaminants carried by the water are hazardous, the water may not be sewerable. Hence the fact that the wet scrubber is highly effective in removing contaminants from the gaseous stream being discharged into the atmosphere does not overcome the problem of discharging water-borne hazardous contaminants into a sewer line.

SUMMARY OF INVENTION

In view of the foregoing, the main object of this invention is to provide a wet electrostatic scrubber unit for extracting from a polluted air stream the particulate matter entrained therein by creating an electrostatically charged mist which captures the particulate matter, whereby emerging from the unit is an environmentally-acceptable air stream.

More particularly, an object of this invention is to provide a unit of the above type in which the electrostatically charged mist is produced by projecting a beam of water at high velocity toward the hard surface of a duct through which is blown the polluted air stream, the beam colliding with this surface with sufficient force to triboelectrically generate negative ions that cause the mist to acquire an electrostatic charge.

A significant feature of the invention is that the negative ions generated in the unit react with oxygen in the air stream to produce ozone that acts as a germicidal agent to destroy microorganisms carried by the air stream and to oxidize the particulate matter captured by the mist whereby the water emerging from the scrubber which carries this oxidized particulate matter is sewerable.

Also an object of the invention is to provide a wet electrostatic scrubber unit that operates efficiently and reliably, and can be manufactured at a relatively low cost.

Briefly stated, these objects are attained in a wet electrostatic scrubber unit for extracting from a polluted air stream particulate matter entrained therein, whereby emerging from the unit is an air stream that is environmentally acceptable. The unit includes a treatment station having a cylindrical duct through which is blown the polluted air stream. Coaxially disposed within the duct is a water delivery pipe having nozzles along its length from each of which is projected toward the duct a radial beam of water.

The radial beam collides with the inner surface of the duct to create a turbulent mist which is intercepted by the polluted air stream flowing through the duct. The velocity of the radial beam is such as to cause it to collide with the duct surface with sufficient force to triboelectrically generate negative ions. These cause the mist to acquire an electrostatic charge to capture the contaminates entrained in the polluted air stream. The negative ions also react with oxygen in the air stream to produce ozone that oxidizes the particulate matter captured by the mist. As a consequence, the water carrying the oxidized particulate matter can safely be discharged into a sewer.

BRIEF DESCRIPTION OF DRAWINGS

For a better understanding of the invention, as well as other objects and features thereof, reference is made to the accompanying drawings wherein.

DESCRIPTION OF INVENTION

The Basic Station

Figure 1:
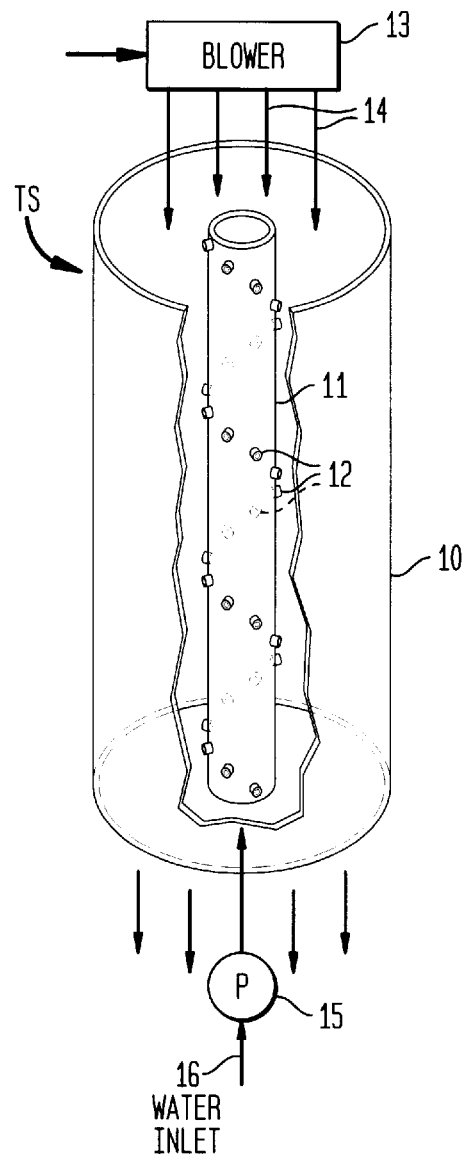
FIG. 1 shows a treatment station that is included in a wet electrostatic scrubber unit in accordance with the invention.
Figure 2:
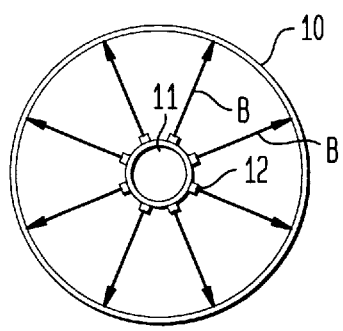
FIG. 2 is a top view of the station.

A wet electrostatic scrubber unit in accordance with the invention includes at least one treatment station TS. Station TS, as shown in FIGS. 1 and 2, includes a cylindrical duct 10 fabricated of a corrosion-resistant metal, such as galvanized steel or aluminum. Coaxially supported within duct 10 is a tubular water delivery pipe 11.

Mounted on pipe 11 at equi-spaced positions along a spiral path running from the upper to the lower end of pipe 11 is a row of nozzles 12 from which radial beams B of water are projected. Blown into duct 10 by means of a blower 13 is a gaseous stream of polluted air represented by arrows 14. The source of this polluted gaseous stream may be an industrial or any other source, such as a plant manufacturing flexible polyurethane foam which yields hazardous air pollutants (HAP) that include methylene chloride and toluene diisocyanate.

Fed into the inlet of water delivery pipe 11 at high pressure through a pump 15 is a water stream 16. As a result, beams B of water are projected radially from nozzles 12 at high velocity to strike the hard inner surface of duct 10 at right angles thereto.

Because nozzles 12 are in a row along a spiral path running the full length of pipe 11, water beams B are distributed circumferentially about the inner surface of cylindrical duct 10. When colliding with the inner surface each beam is reflected and spattered thereby to produce a mist of fine droplets that suffuses the duct. Thus no portion of the gaseous stream blown through duct 10 can avoid intersecting at least one mist produced within the duct by the multitude of water beams B striking the inner surface of the duct.

Figure 3:
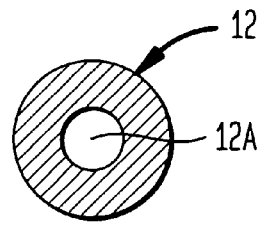
FIG. 3 is an end view of the barrel of a nozzle included in the station to project a beam of water.
Figure 4:
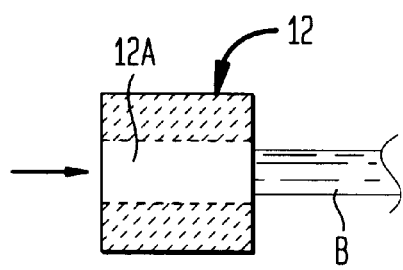
FIG. 4 is a side view of the barrel.

As shown in FIGS. 3 and 4, each nozzle 12 includes a cylindrical barrel projecting from the outer surface of duct 10, the barrel having a cylindrical bore 12A of uniform diameter. The diameter of the bore and the length of the barrel are such as to collimate the projected water beam to prevent it from flaring out. The length of the barrel necessary to effect collimation depends on the radial distance between nozzle 12 and the inner surface of duct 10. When this radial distance is short, say 8 inches, then a barrel length of one half inch is sufficient to effect collimation. But if the radial distance is 12 inches or greater, then a somewhat longer barrel is necessary.

Figure 5:
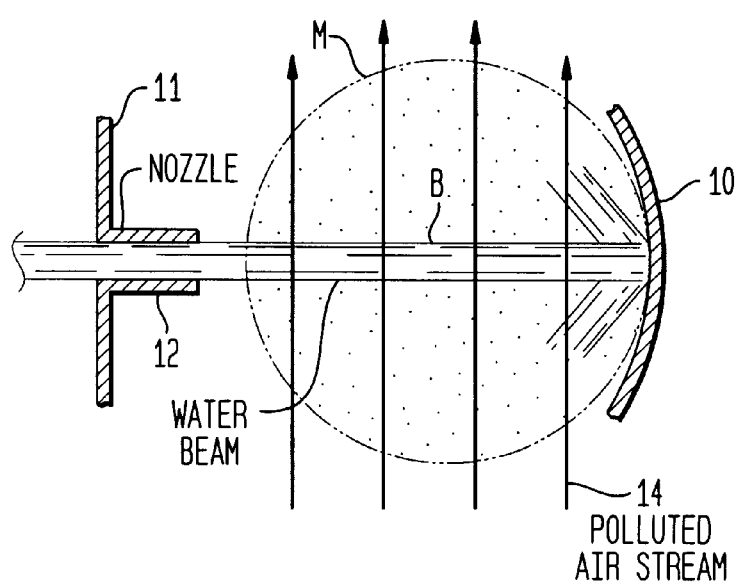
FIG. 5 schematically illustrates the beam of water projected radially from the barrel of the nozzle and colliding with the inner surface of the cylindrical duct of the treatment station.

The reason collimation of the beam is necessary and a flaring out of the beam must be avoided is in order to promote the generation of ions when the radial beam collides with the inner surface of duct 10, as shown in FIG. 5. The beam must strike this surface at high velocity with sufficient force to give rise to a pronounced triboelectric effect generating a considerable quantity of ions. To this end, the velocity of the collimated water beam, as controlled by pump 15 must be such as to maximize the force of its impact with the duct and to atomize the water to create a mist composed of fine droplets.

When water beam B collides at right angles with the inner surface of duct 10 and is reflected and spattered thereby, it creates within the duct a highly turbulent mist M which is electrostatically charged by the tribo-electrically-produced ions. The polluted air stream being blown through duct 10 intersects the turbulent, electrostatically-charged mists M produced within the duct.

As the polluted air stream traverses the mist confined within the cylindrical duct 10, the particulate matter entrained in the air stream and making contact with the water of the mist is transferred to this water. This transfer is promoted by the electrostatic charge which acts to attract and capture the particulate matter.

Thus a wet scrubber action is integrated with an electrostatic precipitator action to extract a greater amount of contaminants from the air stream than can be extracted by either action alone.

Treatment station TS is vertically mounted and the water bearing the contaminants extracted from the polluted air stream is discharged by gravity flow from the station into a pond or pool, from which the contaminated water is fed into a sewer.

The ions generated within station TS do more than electrostatically charge the turbulent mists M to capture pollutants in the air stream, for the ions also react with the oxygen in the air stream to generate ozone.

It is well-known that ozone ($O_3$) is produced by an electrostatic discharge through oxygen ($O_2$). This gas which has a blue color and a characteristic pungent odor is familiar to most persons because ozone is generated by any electrical apparatus, such as a motor, that produces sparks in air. In the treatment station, the electrostatic charge produced by the negative ions acts to generate ozone.

Ozone is highly effective as a germicidal agent and will therefore destroy microorganisms carried by the polluted gaseous stream. Ozone is also a powerful oxidizing agent and will therefore act to oxidize the particulate matter captured by the electrostatically charged mist.

Should this particulate matter be hazardous, it will be rendered innocuous by oxidization. Hence the water carrying the oxidized particulate matter emerging from the treatment station can safely be discharged into a sewer without violating existing environmental protection regulations.

The fact that the unit destroys microbes borne by the gaseous airstream renders the unit applicable to those sources, such as hospitals where in conditioning the atmosphere within the hospital, it is necessary not only to remove particulate pollutants therefrom, but also pathogenic microorganism.

The greater the diameter of duct 10 in treatment station 15, the greater the volume of gas that can be accommodated by the duct. However the greater the duct diameter, the longer is the radial distance from a nozzle on the coaxial water-delivery pipe to the inner surface of the duct, and the more difficult it then becomes to produce a violent collision of the water beam with the duct to generate a considerable quantity of ions.

Hence the optimal duct diameter is necessarily a compromise between a diameter which affords a large gas-handling capacity and a diameter which results in the generation of a considerable quantity of ions. It is important that the treatment station generate a considerable quantity of ions, for only then is ozone produced to oxidize the contaminants extracted from the gaseous stream.

The term gaseous stream, as used herein, covers a stream in which the stream mainly carries the constituents of air, as well as a stream in which these constituents are intermingled with other gases emitted by the polluting source.

The Wet Electrostatic Scrubber Unit

Figure 6:
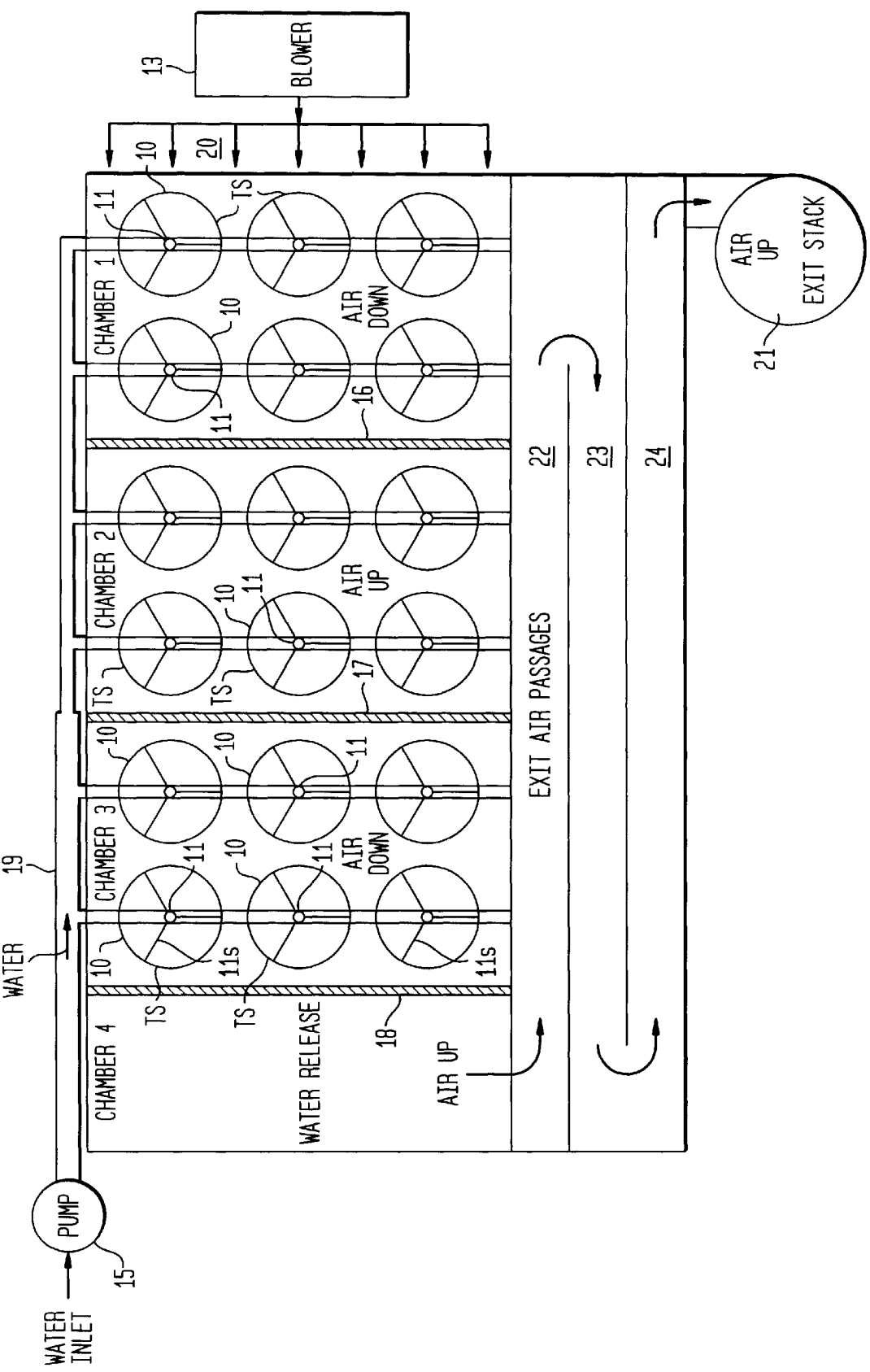
FIG. 6 is a top view of a multi-station wet electrostatic scrubber unit in accordance with the invention.
Figure 7:
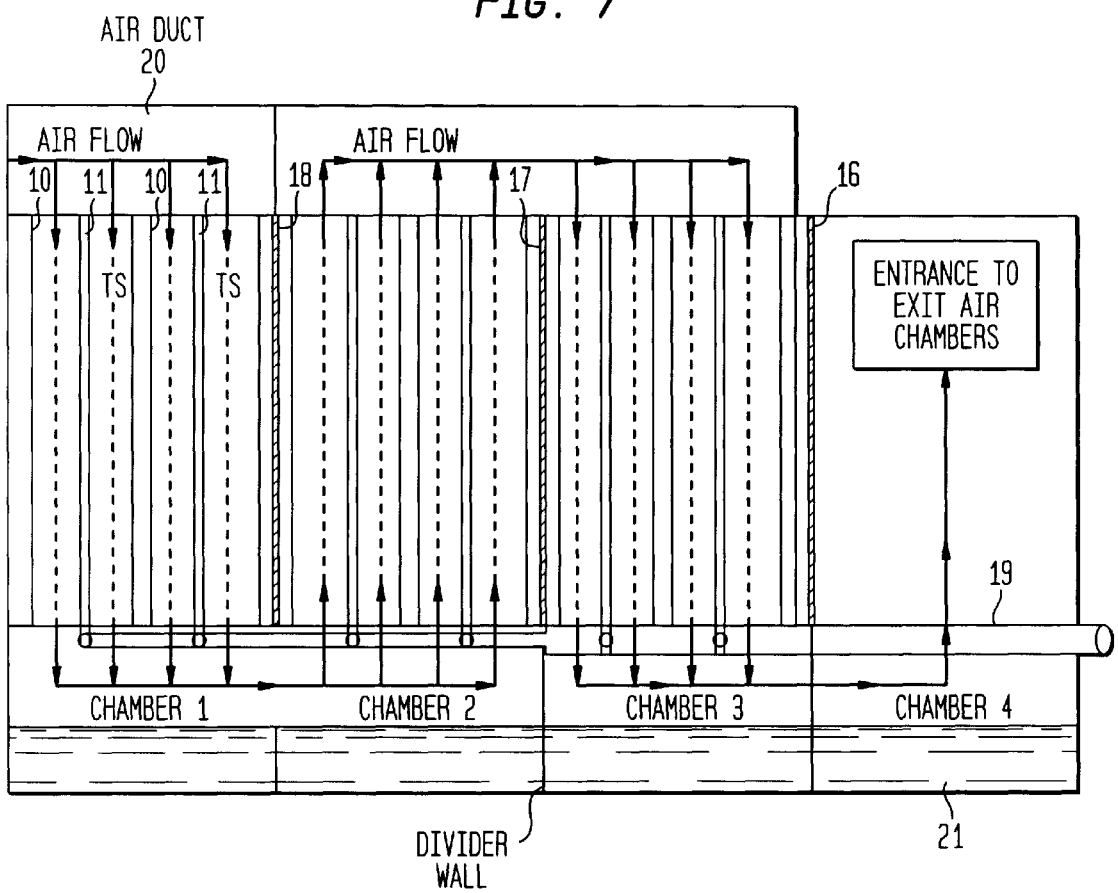
FIG. 7 is a side view of the unit.
Figure 8:
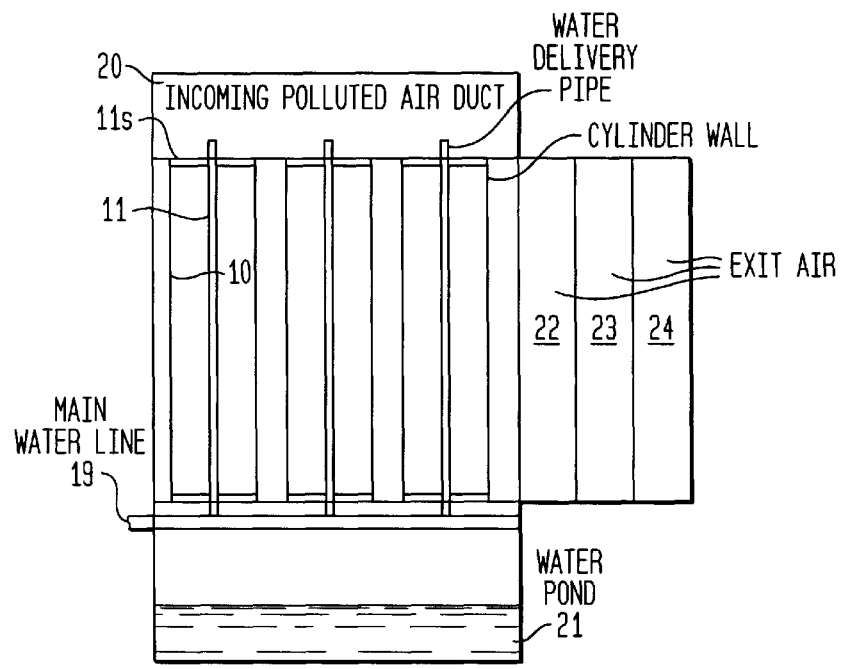
FIG. 8 is an end view of the unit.

FIGS. 6, 7 and 8 illustrate a wet electrostatic scrubber unit in accordance with the invention. This unit includes a multitude of treatment stations TS, so that the unit has a large capacity and is capable of handling the polluted gaseous stream emitted by a large industrial plant or other source whose emissions cannot safely be exhausted into the atmosphere without treatment.

The unit is housed in a generally rectangular casing divided by partition walls 16, 17 and 18 into four chambers 1, 2, 3 and 4. Installed in each of chambers 1, 2 and 3 which are of equal size is a battery of six treatment stations TS which are arranged in two parallel rows each having three stations. In practice each chamber may have a larger or smaller number of stations.

Each station TS has the same structure as the treatment station when in FIGS. 1 and 2 and includes a water-delivery pipe 11 coaxially mounted within a cylindrical duct 10.

Pipe 11 is held in place within the duct by a spider $11_S$ having three arms spaced 120 degrees apart from each other. Not shown in FIGS. 6, 7 and 8 are the nozzles mounted on the delivery pipe to project radial beams of water toward the inner surface of the duct.

Water at high pressure yielded by water pump 17 is fed through a main water line 19 into the inlets at the bottom of delivery pipes 11 in all of the treatment stations TS installed in chambers 1, 2 and 3. The polluted air stream emitted from the industrial plant or other source is blown at high volume by blower 13 into the unit through an air duct 20 so that it is fed into the upper end of the first chamber 1 and passes into the upper ends of the ducts 10 the treatment stations installed in this chamber and flows downwardly through these ducts out of the lower ends thereof.

From the lower ends of ducts 10 in chamber 1 the gaseous stream passes into the lower ends of the ducts in chamber 2 where the gaseous stream is blown upwardly through the ducts to emerge from the upper ends thereof. The gaseous stream emerging the upper ends of the ducts in chamber 2 are fed into the upper ends of the ducts in chamber 3 where the gaseous stream is blown downwardly through these ducts to the lower end of chamber 3 from which it is fed into chamber 4 which is vacant.

The serpentine or tortuous flow path taken by the gaseous stream as it passes successively through the batteries of treatment stations installed in chamber 1, 2 and 3 is indicated by the directional arrows in FIG. 7.

It will be seen by following these arrows that the gaseous stream blown out of blower 13 and fed into the input air duct 20 goes down chamber 1, then up chamber 2 and down chamber 3, from which it is discharged into vacant chamber 4.

The battery of treatment station in each of chambers 1, 2 and 3 by means of the electrostatically charged mists produced in these stations extract the pollutants from the gaseous stream. The water forming these mists which are laden with these pollutants flows by gravity into a collection pool 21 at the bottom of the unit, as shown in FIGS. 7 and 8.

Because in chamber 1, 2 and 3 the gaseous stream is scrubbed by water, the gaseous stream leaving chamber 3 and entering chamber 4 is humidified. But when this stream which is now free of pollutants enters the vacant chamber 4 and is there free to expand, the velocity of the stream is reduced in this chamber. As a consequence, the water borne by the gaseous stream is released in chamber 4 and is collected in pool 21.

In practice, the particulate-laden water in pool 21 may be filtered and recirculated through the unit. But when the water in the pool becomes highly contaminated or exceeds the water-carrying capacity of the pool, it must be discharged into a sewer or otherwise removed.

The relatively moist, pollution-free gaseous stream issuing from the terminal chamber 4 of the unit is caused to flow in an undulatory path through a series of air passages 22, 23 and 24 in which the residual moisture is released. The relatively dry and decontaminated air stream emerging from air passage 24 is exhausted into the atmosphere through an exit stack 25.

Summary

A. The reason the treated gaseous stream exhausted into the atmosphere is substantially free of pollutants is that in the course of its travel through the batteries of treatment stations, particulate matter carried by the stream is extracted by the electrostatically charged mists within the treatment ducts; hence the gaseous stream exhausted into the atmosphere through stack 25 is environmentally acceptable.

B. The reason the water in pool 21 which is laden with contaminants extracted from the gaseous stream can safely be fed into a sewer even though these contaminants may be hazardous, is that ozone produced in the treatment stations as a result of the negative ions triboelectrically generated therein, act to oxidize these contaminants and render them innocuous.

C. The great advantage of a treatment station whose duct is cylindrical and whose radial water beams are projected from nozzles mounted on a coaxial water delivery pipe, is that there are no dead spots or inactive regions within the duct. Hence no portion of the gaseous stream blown through the duct can escape contact with an electrostatically-charged mist produced within the duct.

D. The reason why a battery of relatively small diameter ducts is provided through which the polluted gaseous stream is blown, rather than a single large-diameter duct having the same capacity as the battery of ducts, is that the small diameter duct makes it possible to project a radial-collimated beam of water toward the inner wall of the duct with sufficient force to produce a violent collision which triboelectrically generates a considerable number of ions, and as a consequence an electrostatically charged mist.

E. Another important advantage of a unit in accordance with the invention is that it electrostatically reacts with the oxygen in the stream to generate ozone which kills pathogenic microorganism carried by the stream and also oxidizes and renders innocuous the particulate matter extracted by the unit. And should foul odors emanate from the gas stream, the generated ozone acts to de-odorize the stream.

While there has been disclosed a preferred embodiment of a wet electrostatic scrubber unit in accordance with the invention, it is to be understood that many changes may be made therein without departing from the spirit of the invention.

I claim:

1. A wet electrostatic scrubber unit for extracting from a polluted air stream contaminants entrained therein whereby emerging from the unit is an environmentally acceptable air stream that can safely be exhausted into the atmosphere, said unit including at least one treatment station comprising:

A. a cylindrical duct;

B. a water-delivery pipe coaxially mounted within the duct and provided with at least one nozzle to project a stream of water toward an inner surface of the duct, said nozzle provided with a bore of uniform diameter whose length is such that water is projected therefrom in a collimated beam;

C. means to feed water into said pipe to cause said water beam to be projected at said surface effective to form a mist in the duct created by collision of the water beam with the inner surface of the duct; and D. means to blow the polluted air stream through said duct to intersect said mist which acts to extract the contaminants from the air stream.

2. A unit as set forth in claim 1, in which the duct has a diameter of less than 24 inches.

3. A unit as set forth in claim 1, in which the duct is formed of a corrosion-resistant metal.

4. A unit as set forth in claim 1, comprising a plurality of nozzles and in which said nozzles are mounted on the pipe along a spiral path extending along the length of the pipe.

5. A unit as set forth in claim 1, in which the bore has a length of about one-half inch.

6. A unit as set forth in claim 1, in which the radial distance between the nozzle and the inner surface of the duct is less than 12 inches.

7. A unit as set forth in claim 1, in which a battery of said treatment stations is installed within a chamber into which is blown the polluted air stream which then flows through the ducts of the stations to intersect the mists therein, water from the mists carrying the extracted contaminants flowing by gravity into a collecting pool.

8. A unit as set forth in claim 7, in which the blown air stream treated by the battery of treatment stations in said chamber is fed into a water-release chamber which acts to reduce the velocity of the air stream to release moisture borne thereby.

9. The unit of claim 1, wherein at least one collision of a water beam with the duct is sufficient to generate triboelectrically ions that electrostatically charge said mist.

10. A wet electrostatic scrubber unit for extracting from a polluted air stream contaminants entrained therein whereby emerging from the unit is an environmentally acceptable air stream that can safely be exhausted into the atmosphere, said unit including at least one treatment station comprising:

A. a cylindrical duct;

B. a water-delivery pipe coaxially mounted within the duct and provided with a plurality of nozzles, each projecting a radial stream of water toward an inner surface of the duct said nozzles mounted along a spiral path extending along the pipe;

C. means to feed water into said pipe to cause said water streams to be projected at said surface effective to form a mist in the duct created by collision of each water stream with the duct; and D. means to blow the polluted air stream through said duct to intersect said mist which acts to extract the contaminants from the air stream.

11. The unit of claim 10, wherein at least one nozzle is provided with a barrel having a bore of uniform diameter whose length is such that the water stream projected from the bore is collimated.

12. The unit of claim 10, wherein at least one collision of a water beam with the duct is sufficient to generate triboelectrically ions that electrostatically charge said mist.

13. The unit of claim 10, wherein at least one collision of a water beam with the duct is sufficient to generate ozone.

14. A wet electostaic scrubber unit for extracting from a polluted air stream contaminants entrained therein whereby emerging from the unit is an environmentally acceptable air stream that can safely be exhausted into the atmosphere, said unit including at least one treatment station comprising:

A. a cylindrical duct;

B. a water-delivery pipe mounted coaxially with the duct axis and provided with a plurality of nozzles, each for projecting a collimated beam of water toward an inner surface of the duct;

C. means to feed water into said pipe to cause at least one of said beams of water to be projected at said inner duct surface with sufficient force to generate negative ions, thereby effective to form a mist having an electrostatic charge; and D. means to blow the polluted air stream through said duct to intersect said charged mist which acts to extract the contaminants from the air stream.

* * * * *

UNITED STATES PATENT AND TRADEMARK OFFICE
CERTIFICATE OF CORRECTION

PATENT NO. : 6,231,648 B1
DATED : May 15, 2001
INVENTOR(S) : Delane Marlowe

It is certified that error appears in the above-identified patent and that said Letters Patent is hereby corrected as shown below:

Column 8, claim 14,
Line 44, replace "electostaic" with -- electrostatic --.

Signed and Sealed this

Thirteenth Day of November, 2001

Attest:

NICHOLAS P. GODICI
Attesting Officer    Acting Director of the United States Patent and Trademark Office